Nov. 18, 1969  B. BARÉNYI  3,479,054
HEAD PROTECTION FOR VEHICLE PASSENGERS
Filed July 6, 1967
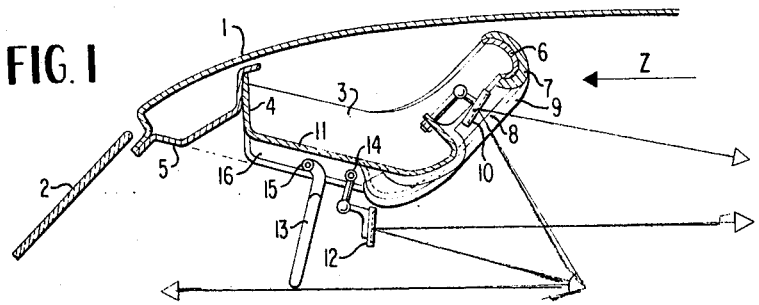
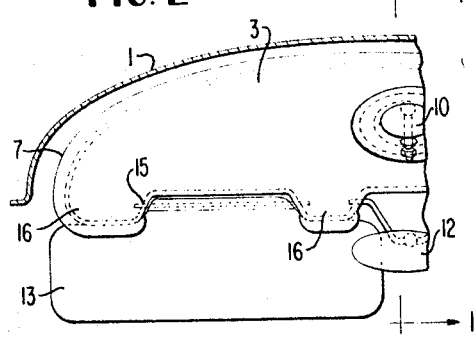 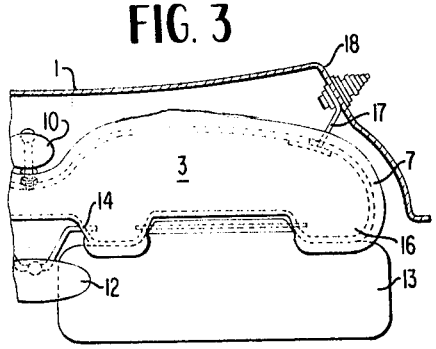
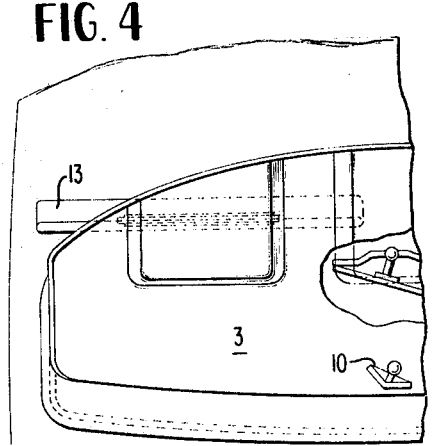 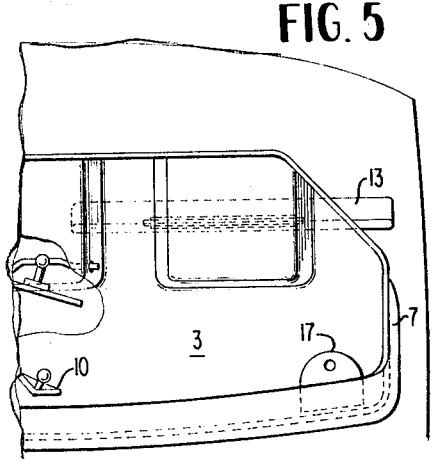
INVENTOR
BELA BARÉNYI
BY
Dicke & Craig
ATTORNEYS United States Patent Office 3,479,054
Patented Nov. 18, 1969

3,479,054
HEAD PROTECTION FOR VEHICLE PASSENGERS
Béla Barényi, Stuttgart-Vaihingen, Germany, assignor to Daimler-Benz Aktiengesellschaft, Stuttgart-Unterturkheim, Germany
Filed July 6, 1967, Ser. No. 651,479
Claims priority, application Germany, July 7, 1966,
D 50,502
Int. Cl. B60r 21/04, 21/06
U.S. Cl. 280—150    14 Claims

ABSTRACT OF THE DISCLOSURE

A protective structure for the heads of the passengers in motor vehicles which essentially consists of a plastically deformable body of approximately half-shell shape; the head protective body is secured to the forward roof section only along the forward and/or lateral portions thereof. The bottom of the protective body structure is provided with recesses within which are pivotally mounted the rearview mirror and sun visors in such a manner as to be pivotal forwardly into these recesses and therewith out of the way. An auxiliary rearview mirror may be provided within a recess or aperture in the upwardly directed rear wall portion of the body which serves as assist in parking the vehicle.

BACKGROUND OF THE INVENTION

The present invention relates to a head protection for passengers of vehicles and aims at achieving an increase in the safety of the vehicle passengers in case of accidents.

It is already known in the prior art to render more safe the interior region of the vehicle roof disposed above the windshield by deflecting or guarding protective parts and/or paddings. These known protective parts and paddings serving as head protection of the vehicle passengers entail the disadvantage that even provided with an abundant amount of padding they decrease only insignificantly the degree of injuries in case of accidents. Additionally, in the predominant number of accidents the head, for the most part, still reaches a dangerous area by the protective construction of the known installations as represented, for example, by the windshield itself or the windowpane edges.

SUMMARY OF THE INVENTION

The present invention aims at avoiding the aforementioned disadvantages of a head protection in vehicles and to create an extraordinarily safe and effective head protection for the passengers of the vehicle. The solution to the underlying problems takes place according to the present invention by a plastically deformable body extending transversely to the vehicle below the forward roof section and of approximately half-shell-shaped construction, which is easily detachably secured only with its forward and/or its lateral parts at the vehicle roof. A type of protective shield is created by the novel head protection according to the present invention which is plastically deformed in case of an accident by the head impinging thereagainst and is therefore able to dissipate considerable energies. The energy dissipation thereby becomes very large by reason of a particularly long deformation path. A free gap is provided between the rearward upper edge of the body and the vehicle roof.

The rearwardly directed wall part of the body may be provided with one or several apertures so that the hollow space formed by the body may be utilized as storage for light-weight objects such as maps and the like.

In a particularly advantageous manner the rearview mirror is pivotally connected at the bottom of the body. This rearview mirror is additionally constructed so as to be pivoted away in the forward direction whereby a further source of injury is eliminated. In a manner similar to the rearview mirror, the sun visor may be pivotally connected at the bottom of the body and may be constructed so as to be pivoted away in the forward direction. It is appropriate with this arrangement to arrange the rearview mirror to the rear of the sun visor as viewed in the driving direction. A particularly safe construction of the body with rearview mirror and sun visor is achieved in that the bottom of the body is provided with recesses, indentations or apertures into which the sun visors and/or the rearview mirror are adapted to be pivoted in a forward direction. The bearing support of the sun visors and of the rearview mirror takes place in an extraordinarily favorable manner within the bottom parts of the body surrounding the recesses, indentations or apertures.

It is favorable if a further rearview mirror is arranged in a recess, indentation, or aperture in the wall part of the body directed rearwardly upwardly. This rearview mirror is of great advantage especially during parking of the vehicle since this mirror permits to the driver a downwardly directed rear view. The free edges and the rearwardly upwardly directed wall part of the body are appropriately provided with a padding.

Two considerable danger sources, which may contribute to the injuries of the vehicle passengers, are eliminated by the arrangement and construction of the rearview mirror and of the sun visors in accordance with the present invention. As a result of the arrangement of the mirror and of the sun visor displaced toward the driver, the mirror and sun visor may also be constructed considerably smaller than heretofore without impairing in any manner in their previous effectiveness. Additionally, the parts which may produce particularly serious injuries, for example, the bearing support of the mirror and of the sun visor, may be accommodated so as to be covered within the body and thus are eliminated as injury source. Also, the fact that the sun visors pivot forwardly under pressure in every case is of considerable advantage.

Accordingly, it is an object of the present invention to provide a head protection for the vehicle passengers of motor vehicles which eliminates by extremely simple and reliable means the aforementioned shortcomings and drawbacks encountered with the prior art constructions.

Another object of the present invention resides in a protective structure for the heads of vehicle passengers which increases the safety of the passengers during accidents.

A further object of the present invention resides in a protection for the heads of the passengers of motor vehicles which considerably decreases the danger of serious accidents.

Still another object of the present invention resides in a protective structure for the heads of the passengers which is capable of absorbing considerable energies caused by impacts of the heads of the passengers thereagainst in case of accidents.

A further object of the present invention resides in a protective structure within the forward area of vehicles to protect the heads of the passengers during impact accidents which is simple in construction, versatile in its usefulness and capable of providing particularly effective rear view.

These and further objects, features, and advantages of the present invention will become more obvious from the following description when taken in connection with the accompanying drawing which shows, for purposes of illustration only, several embodiments in accordance with the present invention, and wherein:

FIGURE 1 is a partial longitudinal cross-sectional view through the forward section of a vehicle roof provided with a plastically deformable head protection according to the present invention;

FIGURE 2 is a partial elevational view of one embodiment of a head protection in accordance with the present invention taken in the direction of the arrow Z according to FIGURE 1;

FIGURE 3 is a partial elevational view of a modified embodiment of a head protection also taken in the direction of the arrow Z according to FIGURE 1;

FIGURE 4 is a partial plan view on the head protection according to FIGURE 2; and FIGURE 5 is a partial plan view on the head protection according to FIGURE 3.

Referring now to the drawing wherein like reference numerals are used throughout the various views to designate like parts, and more particularly to FIGURE 1, a plastically deformable body generally designated by reference numeral 3 is arranged as head protection for the vehicle passengers below the forward roof section 1 and above the windshield 2. The plastically deformable body 3 is constructed approximately in the form of a half-shell. This body 3 is secured in a readily detachable manner with its forward edge 4 at the closure part of the vehicle roof 1. The rearward upper edge 6 of the body 3, in contradistinction thereto, is arranged freely supported, i.e., in a cantilever manner and is not connected to the vehicle roof 1. The edge 6 is additionally bent over in an appropriate manner and is provided with a padding 7 which extends over the entire rearward wall portion 8 of the body 3 and over all rims or edges present therein. The rearwardly directed wall portion 8 may be provided with one or several apertures 9 so that the interior of the body 3 is accessible from the outside and may be utilized as storage for light-weight, small travel objects. Additionally, a separate rearview mirror 10 may be arranged within a recess or also within an aperture 9 accommodated at the body 3 which rearview mirror may be utilized as additional assist during parking. As can be recognized readily from the lines provided with arrows in the drawing, this rearview mirror 10 permits to the driver a viewing direction which is directed particularly low.

A rearview mirror 12 as well as sun visors 13 are secured at the bottom 11 of the body 3. These parts 12 and 13 are constructed so as to be pivotal out of the way in the forward direction. The bearing support 14 of the rearview mirror 12 and the bearing support 15 of the sun visor 13 take place in recessed parts 16 of the bottom 11 and are covered by the bottom 11. After the pivoting-away action, the rearview mirror 12 and the sun visor 13 are disposed within recesses specially constructed therefor within the bottom 11 of the body 3. The head protective body 3 is illustrated in FIGURE 2 as viewed in the direction Z according to FIGURE 1. The rim of the body 3 as well as the rearward wall 8 thereof are padded in any conventional manner. The aperture 9 is located in the center of the rearwardly disposed wall 8 into which is inserted the rearview mirror 10. The rearview mirror 12 is also arranged within the vehicle center. A sun visor 13 is mounted additionally on each side below the body 3. The rearview mirror 12 and also the sun visors 13 are supported within the recessed portions 16 of the body 3.

A modified construction of the head-protective body 3 is illustrated in FIGURE 3. The head-protective body 3 of this embodiment is arranged in a vehicle provided with a concavely constructed roof 1. The edge of the body 3 and also the rearwardly disposed wall portion 8 are provided with a padding 7. The rearview mirror 12 and the sun visors 13 are adapted to be pivoted out of the way below the body 3 into recesses. The body 3 itself is secured at the lateral struts 18 of the roof 1 by means of special supports 17. The second rearview mirror 10 provided for purposes of parking is located in a recess arranged above the body 3.

The head-protective bodies according to FIGURES 2 and 3 are illustrated, respectively, in FIGURES 4 and 5. The second rearview mirror 10 serving the purpose of parking is provided with two surfaces arranged to each other at an angle so that the driver is able to direct his views either to the left or to the right side of the vehicle.

While I have shown and described two embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as the encompassed by the scope of the appended claims.

I claim:

1. A head protection for passengers of motor vehicles having a forward roof section, wherein the improvement comprises plastically deformable body means extending essentially transversely below the forward roof section, said body means being approximately of semi-shell shape and being secured at the vehicle roof only at certain parts thereof, further comprising sun visor means pivotally secured at the bottom of the body means for pivoting forwardly under pressure and out of the way of a passenger in case of danger.

2. A head protection according to claim 1, wherein the body means includes a rearward upper edge portion, a free gap being provided between said rearward upper edge portion and the vehicle roof, rearview mirror means pivotally connected to the bottom of the body means constructed so as to be tiltable forwardly.

3. A head protection according to claim 2, wherein the rearview mirror means is arranged to the rear of the sun visor means, as viewed in the driving direction.

4. A head protection according to claim 3, wherein the bottom of the body means is provided with recesses into which at least one of the parts consisting of the sun visor means and the rearview mirror means are adapted to be pivoted at least partially.

5. A head protection according to claim 4, wherein the support of the rearview mirror means and of the sun visor means takes place in the bottom parts of the body means surrounding the recesses.

6. A head protection according to claim 5, further comprising additional rearview mirror means arranged within an aperture in the upwardly directed rear wall portion of the body means.

7. A head protection according to claim 1, wherein the body means includes an upwardly directed rear wall portion which is provided with at least one aperture.

8. A head protection according to claim 1, further comprising rearview mirror means pivotally connected to the bottom of the body means.

9. A head protection according to claim 8, wherein said rearview mirror means is constructed so as to be tiltable forwardly.

10. A head protection according to claim 9, wherein the rearview mirror means is arranged to the rear of the sun visor means, as viewed in the driving direction.

11. A head protection according to claim 9, wherein the bottom of the body means is provided with recesses into which at least one of the parts consisting of the sun visor means and the rearview mirror means are adapted to be pivoted at least partially.

12. A head protection according to claim 11, wherein the support of the rearview mirror means and of the sun visor means takes place in the bottom parts of the body means surrounding the recesses.

13. A head protection according to claim 12, further comprising additional rearview mirror means arranged within an aperture in the upwardly directed rear wall portion of the body means.

14. A head protection according to claim 9, further comprising additional rearview mirror means arranged within an aperture in the upwardly directed rear wall portion of the body means.

References Cited

UNITED STATES PATENTS

| | | | |
|---|---|---|---|
| 2,969,715 | 1/1961 | Mosby | 248—486 |
| 3,371,903 | 3/1968 | Thompson | 248—486 |
| 2,854,281 | 9/1958 | Cassin | 280—150 |
| 3,188,112 | 6/1965 | Oelkrug | 280—150 |

FOREIGN PATENTS

| | | |
|---|---|---|
| 1,382,854 | 2/1964 | France. |
| 999,331 | 7/1965 | Great Britain. |
| 629,038 | 4/1960 | Italy. |
| 1,115,317 | 12/1955 | France. |

LEO FRIAGLIA, Primary Examiner

ROBERT R. SONG, Assistant Examiner

U.S. Cl. X.R.

290—84, 97